United States Patent Office 3,330,476
Patented July 11, 1967

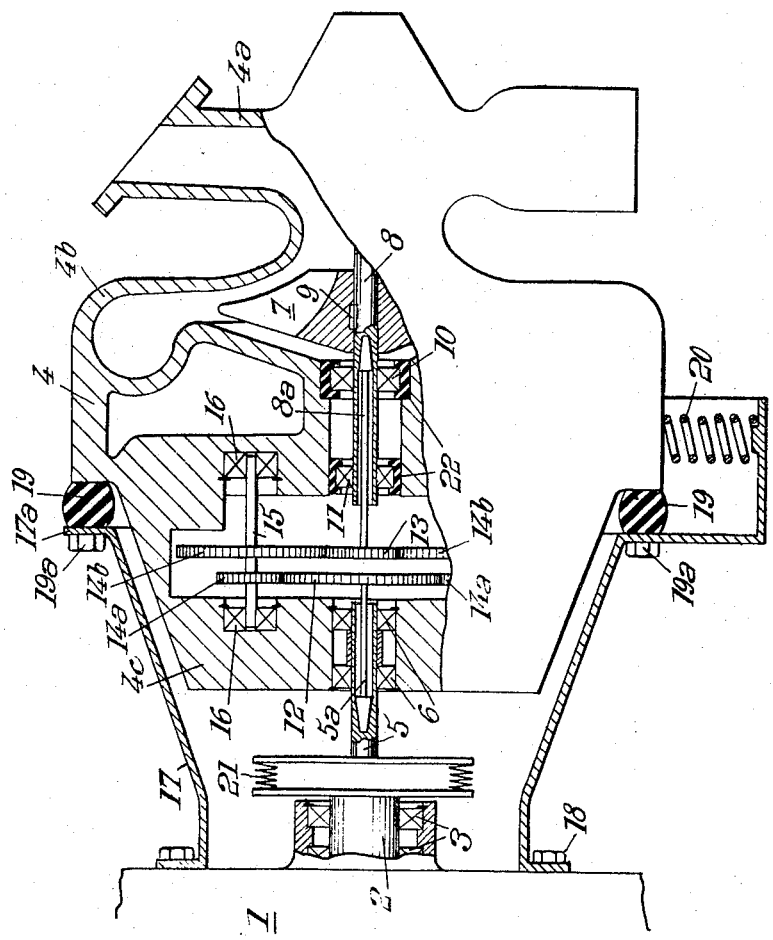

3,330,476
ROTOR APPARATUS MECHANICALLY DRIVEN
FROM A POWER RELAY
Martin François Marcel Bruyere, Bois-Colombes, France, assignor to Societe d'Exploitation des Materiels Hispano-Suiza, Bois-Colombes, France
Filed Jan. 10, 1966, Ser. No. 519,559
Claims priority, application France, Jan. 22, 1965, 2,941/65
4 Claims. (Cl. 230—232)

The present invention relates to rotor apparatus the rotor of which is mechanically driven, generally through a speed multiplying gear, from a driving shaft belonging to a power relay acting as support for the rotor apparatus. The term "power relay" should be taken in a very broad meaning including both machines having a mere function of transmission and machines capable of developing some power. The present invention is more especially concerned with the case where the rotor apparatus is an air compressor for supplying air under pressure to an aircraft cabin, such an air compressor being supported and driven by a power relay operated by the power plant of the aircraft and serving to drive various accessories.

The object of the present invention is to provide a combination of the type above described which is better adapted to meet the requirements of practice than those used for the same purposes up to the present time, in particular concerning safety of operation and long life thereof.

A combination according to the present time is characterized by the fact that, on the one hand, the casing of the rotor apparatus is supported by the casing of the power relay through resilient means, whereas resilient suspension means are interposed between the two above mentioned casings for balancing the action of gravity upon the rotor compressor which is mounted in overhanging position with respect to the power relay and that, on the other hand, the output shaft of the power relay and the input shaft of the rotor apparatus are mounted in line with each other and coupled together through angularly resilient means.

Preferably when the rotor apparatus includes an input shaft and a rotor carrying shaft coupled therewith through speed multiplying means, the transmissions between the two last mentioned shafts and said multiplying means are resilient.

A preferred embodiment of the present invention will be hereinafter described with reference to the appended drawings, given merely by way of example, and in which:

The only figure is a diagrammatic elevational view, partly in axial section, of a compressor for feeding air under pressure to an aircraft cabin.

The compressor which is to feed air under pressure to the aircraft cabin is mounted in overhanging position on the power relay 1 of said aircraft which is provided with an output shaft 2 supported in bearings 3.

The compressor includes:

A casing 4 provided with an air intake 4a, an output scroll 4b and a speed multiplying gear casing 4c;

An input shaft 5 located opposite shaft 2 and supported in casing 4 through bearings 6;

An impeller 7 fixed on shaft 8 through a key 9 and supported by two bearings 10 and 11 both located on the same side of said impeller, bearing 10 being the main bearing; and A speed multiplying gear housed in casing portion 4c and adapted to couple together input shaft 5 and the impeller shaft 8, the speed multiplying gear comprising a central toothed wheel 12 driven by input shaft 5, another central toothed wheel 13 coupled with the impeller shaft 8 and several (for instance three) planet wheel systems the wheels of which, such as 14a and 14b are carried by a shaft 15 mounted in bearings 16 supported by casing portion 4c.

Of course, the respective number of teeth of toothed wheels and pinions 12, 13, 14a and 14b are chosen to obtain for the impeller shaft 8 the desired speed of revolution with respect to the speed of revolution of the input shaft.

It should be noted that the speeds of the rotary parts of such a compressor are very high, the output shaft 2 of power relay 1 revolving at approximately 15,000 revolutions per minute, whereas impeller 7 and shaft 8 generally rotate at speeds approximating 60,000 revolutions per minute.

This explains the difficulties that are encountered for ensuring safety of operation and long life of the apparatus which serves to couple together shaft 2 and shaft 8 belonging respectively to two systems (power relay and compressor) each having its own vibrations and the rotary parts having their own respective critical speeds of revolution. Furthermore the compressor exerts high stresses on the bearings of the rotary shaft thereof.

According to the present invention, the casing 4 of the compressor is carried by rigid support 17 rigidly fixed to one side of the casing of power relay 1 through fixation bolts 18, the input shaft 5 of the compressor being located opposite the output shaft 2 of relay 1.

There is interposed, between said compressor and said support 17, a resilient suspension device for protecting the compressor against the effect of the vibrations of support 17, said suspension device consisting for instance of a plurality of rubber pads 19 distributed circumferentially and held and precompressed by fixation bolts 19a extending through a peripheral flange 17a of support 17, said bolts being screwed in the edge of compressor casing 4.

There is provided, between casing 4 and the relay, balancing return means tending to oppose the weight of the compressor mounted in overhanging position. Said return means consist of at least one spring 20 disposed under the casing (or a plurality of such springs distributed along a circular arc). The force exerted by said balancing means 20 passes through the axis of the compressor preferably in the vicinity of the center of gravity thereof.

To permit the operation of the elastic suspension means 19, the opposite ends of the relay output shaft 2 and of the compressor input shaft 5 are coupled through flexible angular coupling means 21 capable of permitting small misalinements between said two shafts.

On the drawings the flexible angular coupling means 21 are shown in the form of a mere metallic bellows connecting together two plates respectively rigid with the two shafts to be coupled together. However for practical purposes it may be advantageous to constitute said coupling means by diaphragm coupling devices or flexible radial arms devices (called "Flectors") a plurality of such devices being possibly mounted in series in such manner as to increase the flexibility of the coupling means.

Instead of directly mounting the toothed wheels 12 and 13 of the speed multiplying gear directly upon shafts 5 and 8 respectively, it is possible to use shafts 5a and 8a coupled with said shafts 5 and 8 in a flexible manner.

For this purpose shafts 5 and 8 may be of tubular shape, coaxially surrounding shafts 5a and 8a, which are flexible shafts having their inner ends coupled rigidly with the bottoms of shafts 5 and 8 respectively.

With such an arrangement, the torque transmitted through shafts 5–5a and 8–8a is substantially pure whereas slight transverse displacements of the central toothed wheels 12 and 13 are permitted which ensures a good transmission.

In order to reduce the stresses in the bearings of the rotor, the inner portions of bearings 10 and 12 are resiliently supported through means 22 which tend to center them on the axis of impeller 7. Advantageously, said resilient supporting means are constituted by an annular block of a resilient material such as rubber, or by a flexible metallic box the displacements of which are absorbed by a thin oil layer.

The construction above described has a safe operation and is capable of lasting very long although of relatively simple construction and a reduced volume and weight.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. In combination,
   a power relay including a casing and an output shaft journalled in said casing,
   a compressor including a casing,
   support means rigidly secured to said power relay casing in overhanging relation therewith,
   resilient fixation means for securing said compressor casing to said overhanging support means,
   resilient suspension means between said power relay casing and said compressor casing for balancing the action of gravity upon said compressor,
   a compressor input shaft journalled in said compressor casing and in line with said power relay output shaft, and
   angularly resilient coupling means interposed between said relay output shaft and said compressor input shaft.

2. A combination according to claim 1 wherein said compressor comprises,
   an impeller rotatable in said compressor casing,
   an impeller shaft rigid with said impeller and journalled in said compressor casing,
   and speed multiplying means interposed between said compressor input shaft and said impeller shaft said speed multiplying means being resiliently coupled with said compressor input shaft and said impeller shaft.

3. A combination according to claim 2 wherein said resilient fixation means between said compressor casing and said overhanging support means consist of rubber pads.

4. A combination according to claim 2 further comprising radially deformable means for mounting said impeller shaft in said compressor casing.

References Cited

UNITED STATES PATENTS

| | | | |
|---|---|---|---|
| 2,916,198 | 12/1959 | Weisel | 230—116 |
| 2,973,894 | 3/1961 | Kimball et al. | 230—127 |

ROBERT M. WALKER, *Primary Examiner.*